No. 628,310. Patented July 4, 1899.
S. GOLDNER.
GAGE FOR DIAMONDS AND THEIR MOUNTINGS.
(Application filed June 20, 1898.)
(No Model.)
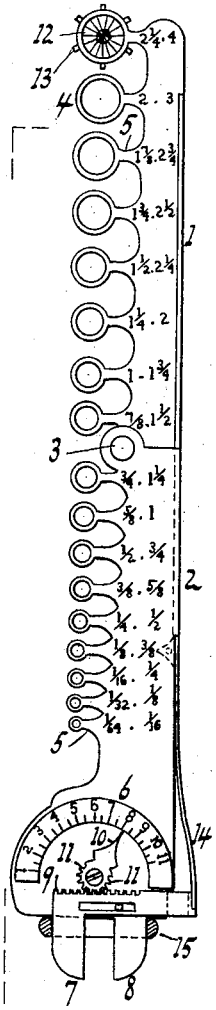
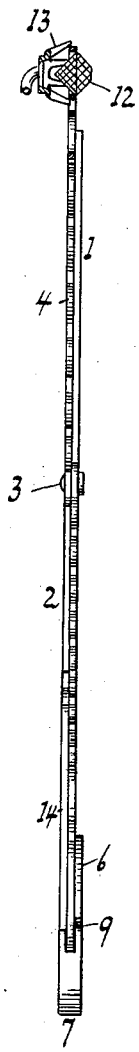
WITNESSES:
INVENTOR
Simon Goldner
BY
Hauff + Hauff
ATTORNEYS

UNITED STATES PATENT OFFICE.

SIMON GOLDNER, OF NEW YORK, N. Y., ASSIGNOR OF ONE-HALF TO JACOB STRAUSS & SONS, OF SAME PLACE.

GAGE FOR DIAMONDS AND THEIR MOUNTINGS.

SPECIFICATION forming part of Letters Patent No. 628,310, dated July 4, 1899.

Application filed June 20, 1898. Serial No. 683,983. (No model.)

*To all whom it may concern:*

Be it known that I, SIMON GOLDNER, a subject of the King of Roumania, residing at New York, in the county and State of New York, have invented new and useful Improvements in Diamond and Mounting Gages and Ring-Gages, of which the following is a specification.

By means of this invention diamonds, as also their mountings, can be readily gaged, as set forth in the following specification and claim and illustrated in the annexed drawings, in which—

Figure 1 is a face view of a gage. Fig. 2 is an edge view of Fig. 1.

The gage or scale is shown comprising a base or sections 1 and 2, jointed or pivoted at 3, so as to be folded up when not in use or to be put away. The gage is provided with rings 4, the exterior as well as the interior of which is adapted for gaging. A suitable scale on the base will indicate weight—as, for example, that of a diamond 12 fitting the largest ring, as two-and-a-quarter karats; and that a mounting or claws 13, fitting or slipping about the exterior of this ring, is adapted for setting a stone of four karats. Each ring being thus provided with a double scale or numeration will serve the double function of a diamond-gage as also of a gage for the mounting or setting of a diamond. The rings being mounted clear of one another, their exterior is left free for gaging. Each ring is shown carried by a supporting-arm 5, projecting from the base and made to engage its ring at one spot or point, so as to leave practically the entire exterior of the ring clear for gaging. The base has one of its sections provided with a scale 6 for gaging rings. One of the jaws 7 and 8 is movable or sliding and connects by rack 9 with hand or index 10, so as to actuate or move the latter over the scale. A returning-spring 14 normally holds the index at the starting-point, and as a smaller or larger ring 15 is slipped over the jaws the movable jaw 7 is moved more or less to carry the index 10 to a lower or higher number on scale 6.

The index 10, it is seen, is formed integral with or has its pivot or hub portion formed as a pinion 11 for the mesh of rack 9.

What I claim as new, and desire to secure by Letters Patent, is—

A gage comprising a base having a series of arms each of which carries at its outer extremity a ring the interior and exterior of which are adapted for gaging, said arms engaging the rings at one point and supporting them clear of each other, the respective internal and external measurements of each ring being denoted on the base opposite thereto, substantially as described.

In testimony whereof I have hereunto set my hand in the presence of two subscribing witnesses.

SIMON GOLDNER.

Witnesses:
W. C. HAUFF,
E. F. KASTENHUBER.